Patented Sept. 2, 1924.

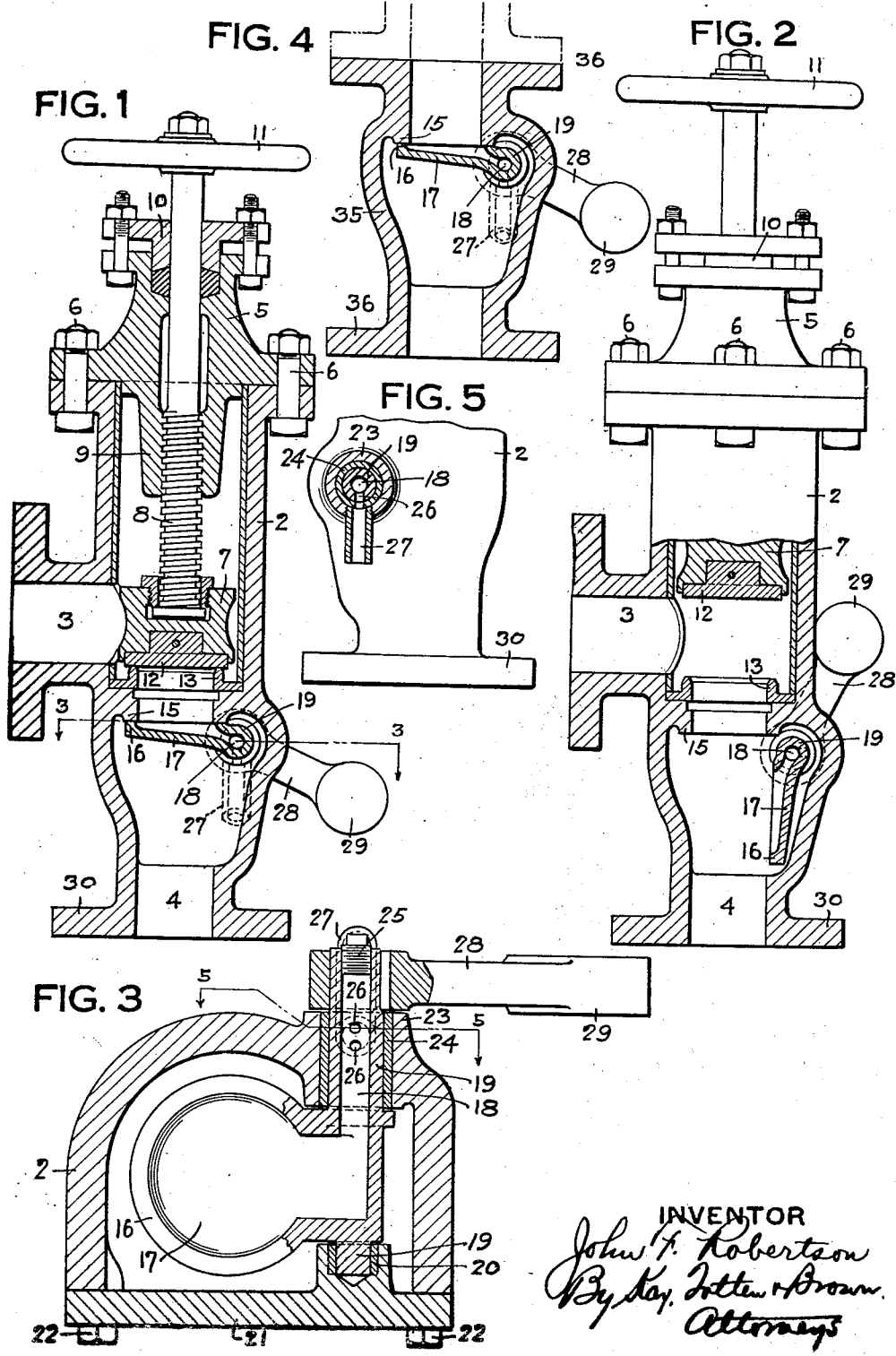

1,507,001

UNITED STATES PATENT OFFICE.

JOHN F. ROBERTSON, OF BELLEVUE, PENNSYLVANIA; NELLIE ECKERT ROBERTSON ADMINISTRATRIX OF SAID JOHN F. ROBERTSON, DECEASED.

VALVE.

Application filed December 13, 1920. Serial No. 430,380.

*To all whom it may concern:*

Be it known that I, JOHN F. ROBERTSON, a citizen of the United States, and resident of Bellevue, in the county of Allegheny and State of Pennsylvania, have invented a new and useful Improvement in Valves; and I do hereby declare the following to be a full, clear, and exact description thereof.

My invention relates to valves, and it has special reference to blow-out valves for boilers.

One object of my invention is to provide a device for indicating the leakage of fluid past a closed valve.

Another object of my invention is to provide means for entrapping fluid that may leak past a valve, and for conducting such leakage fluid to the outer atmosphere.

A further object of my invention is to provide means for preventing the backward flow of fluid through a valve and for thereby insuring the safety of boiler systems having several blow-out valves.

The blow-out valve of a boiler is subjected to rapid wear, on account of the scale and dirt that are blown out through the valve with the waste water. When thus worn, the valve becomes leaky, and even before the working parts are scored so as not to seat properly, particles of scale may stick on the valve or on its seat and may hold the valve partly open; or a careless operator may fail to close the valve perfectly tight. For all of these reasons, leakage through blow-out valves is a frequent source of loss, extra fuel being required to keep up the normal boiler efficiency. Although the importance of keeping blow-out valves tightly closed has been recognized, there has never been any way of telling positively whether any particular valve in a boiler system is leaking or not. The amount of water flowing from the drain pipe shows the total leakage in the system, but gives no indication as to which blow-out valve is at fault.

My present invention aims primarily to provide a valve attachment, either built in with the valve or added as an additional fitting, by which the leakage of fluid past the valve will be positively and quickly shown. I prefer to do this by entrapping the leakage fluid and conducting it to the outer air, and for this purpose I provide a member in the nature of a clapper valve which extends across the path of fluid flow, on the discharge side of the main valve, and collects any fluid that may leak past the main valve, conducting this fluid to a channel which, at this time, is open to the air. When the main valve is opened, the auxiliary clapper valve member is deflected to one side, thereby closing the channel and preventing the escape of fluid while the main valve is open.

In addition to collecting leakage fluid, the auxiliary clapper member performs the function of a safety check, by preventing back pressure from forcing fluid backward through the valve. This is an important advantage, because it sometimes happens that when one boiler in a system is shut down for cleaning or repairs, a workman may enter the boiler without carefully closing the blow-out valve. If then another boiler in the system is blown out, the pressure in the waste line will force hot water or steam into the idle boiler and may scald the workman.

The accompanying drawing shows a well-known type of blow-out valve equipped with a leakage indicator and safety check constructed in accordance with my invention. Fig. 1 is a vertical section through the valve, showing the valve closed; Fig. 2 is a side view, partly in elevation and partly in section, showing the valve open; Fig. 3 is a horizontal sectional view taken substantially on the line 3—3, Fig. 1; Fig. 4 is a vertical sectional view showing my invention constructed as a separate fitting, instead of being built in with the valve; and Fig. 5 is a side view of a portion of the valve showing the leakage outlet in vertical section, the section being taken substantially on the line 5—5, Fig. 3.

The valve shown in the drawing comprises a casing 2 provided with an inlet port 3, an outlet port 4, a head 5 secured to the casing 2 by means of bolts 6, and a valve member 7 secured to the lower end of a screw 8 which extends through a threaded sleeve 9 and a gland 10, and is provided at its upper end with a hand wheel 11. The under side of the valve member 7 is provided with a plate 12 which is adapted to engage a soft metal ring 13 which forms the valve seat.

The parts of the valve thus far described are all of ordinary construction and are here shown merely for the purpose of illustrating my invention, it being understood that my invention may also be applied to any other type of valve.

Below the ring 13, the casing 2 is provided with an annular flange 15 corresponding in size and shape to a flange 16 formed around the edge of a clapper valve member 17. The member 17 thus forms a shallow receptacle, having its bottom sloping downward into communication with the bore 18 of a hollow shaft 19, one end of which is received in a bushed bearing 20 carried by a door plate 21 which covers an opening in the casing 2 and is secured in place by means of bolts 22. The other end of the hollow shaft 19 extends through and beyond a bearing 23 containing a suitable bushing 24, and is closed at its free end by means of a screw plug 25, which may be removed for cleaning the inside of the device.

Two small openings 26 are formed in the wall of the hollow shaft 19 within the bearing 23 and these openings provide communication between the bore 18 of the shaft and a short tube 27 which is screwed into the bearing 23 and communicates with the atmosphere. An arm 28 is keyed to the outer end of the shaft 19 and carries a weight 29 which normally maintains the clapper valve 17 in the position shown in Fig. 1 with its flange 16 tightly seated against the flange 15.

I prefer to provide two of the small openings 26 instead of one large opening, because the small openings are quickly shut off by a small rocking movement of the clapper valve, while a larger opening would require a greater movement for closing, and might permit the escape of fluid while the main blow-out valve is being opened. The tube 27 is preferably set in the bearing 23 at such an inclination that the leakage water dripping through it will clear the bottom flange 30 of the valve casing. The end of this tube may be left free, and the drip received in any suitable vessel, or it may be arranged to drip into a waste pipe, a space being left below the end of the tube so that the operator can always see whether leakage water is flowing or not.

The form of my device shown in Fig. 4 is similar in construction to that described above, except that it is made as a separate fitting, with a casing 35 having upper and lower flanges 36, similar to the flange 30 in Fig. 1, for inserting the device in a pipe line on the discharge side of the valve to be controlled. By employing such a separate fitting, my invention may be applied to any standard form of blow-out valve or to any other kind of valve where it is desired to indicate the leakage of steam, water or other fluid.

When the valve member 7 is raised by turning the hand wheel 11, waste water passes from the boiler through the inlet port 3 and the ring 13, deflects the clapper valve member 17 into the position shown in Fig. 2, and passes out through the outlet port 4. This movement of the clapper valve 17 turns the openings 26 away from the tube 27 and the water passing through the valve is therefore unable to escape from the casing through the tube 27. In the position shown in Fig. 2 the clapper valve is entirely out of the way, and neither offers resistance to the flow of fluid, nor collects scale or dirt from the flowing water. When the main valve is closed, the clapper valve 17 is relieved from the steam pressure and the weight 29 again brings the clapper valve to the position shown in Fig. 1, where it is maintained both by the weight 29 and by the back-pressure in the line. If the valve member 7 should not be tightly seated on the ring 13, the fluid which leaks around the valve member will pass down into the shallow receptacle formed by the flange 16 and through the bore 18, the openings 26 and the tube 27, to the outer air. This leakage fluid can be seen dripping from the tube 27 and the operator can thus plainly see that the valve is not tightly closed.

Any considerable leakage will also be shown by the position of the arm 28, since if the main valve leaks enough to produce a substantial pressure on the clapper valve 17, the clapper valve will be forced down somewhat and will raise the arm 28. The arm 28 also indicates by its movement whether the main valve is operating properly, by rising when the main valve is opened and descending when the main valve is closed.

The arm 28 may also be employed for indicating the number of times that the boiler is blown out in a given period by applying a counting mechanism of any suitable construction to be operated by the oscillations of the arm 28, and to indicate the number of such oscillations.

While I have herein shown and described in detail one desirable form in which I have applied my invention, it will be understood that the invention may also be applied to many other forms of valves and that the details of construction may be changed in various respects according to circumstances. I therefore desire that no limitations be imposed upon my invention except such as are indicated in the appended claims.

I claim as my invention:

1. Means for indicating leakage of fluid through a valve, in combination with means for automatically rendering the first-named means inoperative during normal flow through the valve.

2. Means for indicating leakage of fluid through a valve and for preventing backward flow of fluid through said valve.

3. Means for entrapping fluid leaking through a valve and for conducting said fluid to the outer atmosphere.

4. A valve provided with means for indicating leakage of fluid therethrough and means for rendering the first-named means inoperative during normal flow through the valve.

5. A valve provided with means for indicating leakage of fluid therethrough and for preventing backward flow of fluid through said valve.

6. A valve provided with means for entrapping fluid leaking therethrough and for conducting said entrapped fluid to the outer atmosphere.

7. A valve provided, on its discharge side, with means for establishing a channel to the outer atmosphere and for conducting leakage fluid into said channel, and means for closing the said channel when the said valve is opened.

8. A valve having a main valve member, an auxiliary check valve member on the discharge side of the said main valve member, and means associated with the said check valve member for indicating leakage of fluid past said main valve member.

9. A valve having a main valve member, an auxiliary check valve member on the discharge side of the said main valve member, and means associated with the said check valve member for entrapping fluid leaking past said main valve member and for conducting said entrapped fluid to the outer atmosphere.

10. A valve having a main movable valve member, a pivotally movable auxiliary valve member on the discharge side of the said main valve member and in the path of flow through said main valve member, and gravity-operable means, visible from the outside of the said valve, for indicating the position of the said auxiliary valve member.

11. A valve having a main movable valve member, a pivotally movable auxiliary valve member on the discharge side of the said main valve member, gravity-operable means, visible from the outside of the said valve, for indicating the position of the said auxiliary valve member, and means associated with the said auxiliary member for conducting to the outer atmosphere any fluid that may leak past the said main valve member.

12. A valve having a main movable valve member, a pivotally movable auxiliary valve member on the discharge side of the said main valve member and having a drain passage, and gravity-operable means, visible from the outside of the said valve, for indicating the position of the said auxiliary valve member and for preventing the escape, through the said drain passage, of fluid passing through the said valves under substantial pressure.

13. A valve attachment comprising a pivotally mounted clapper valve member, means for normally maintaining the said member in position across a path of fluid flow, and means for conducting to the outer atmosphere any fluid that may reach the said member while the said member is in its said normal position.

14. A valve attachment comprising a pivotally mounted clapper valve member, gravity-operable means for normally maintaining the said member in position across a path of fluid flow, while permitting the said member to be deflected by fluid pressure in the said path, and means for conducting to the outer atmosphere any fluid that may reach the said member while the said member is in its said normal position.

15. A valve attachment comprising a casing provided with an annular seat, a clapper valve member having a flange forming a receptacle for receiving leakage fluid, the said flange being adapted to engage the said seat, and means for conducting fluid from the said receptacle to the outer atmosphere.

16. A valve attachment comprising a casing provided with an annular seat, a clapper valve member having a flange forming a receptacle for receiving leakage fluid, the said flange being adapted to engage the said seat, means for conducting fluid from the said member to the outer atmosphere, and means for closing communication between the said member and the outer atmosphere when the said member is moved away from the said seat.

17. A valve attachment comprising a casing provided with an annular seat, a clapper valve member having a flange forming a receptacle for receiving leakage fluid, means for conducting fluid from the said member to the outer atmosphere, and gravity-operable means for normally maintaining the said member in engagement with the said seat, while permitting the said member to yield under substantial fluid pressure.

18. A valve attachment comprising a casing provided with an annular seat, a clapper valve member having a flange adapted to engage the said seat and forming a receptacle for receiving leakage fluid, a hollow shaft carrying the said valve member and having its internal bore in communication with the said receptacle, a tubular discharge member disposed adjacent to the said shaft and communicating with an opening formed in the wall of the said hollow shaft, an arm secured to the said shaft, and a weight carried by the said arm and normally maintaining the said flange against the said seat.

19. A valve attachment comprising a casing provided with an annular seat, a clapper valve member having a flange forming a receptacle for receiving leakage fluid, a hollow rock shaft carrying the said valve member and also carrying a lateral arm, a weight carried by the said arm and normally maintaining the said flange in engagement with the said seat and a tubular member having one end disposed adjacent to the said shaft and having its other end open to the atmosphere, the said shaft having an opening in its wall communicating with the said tubular member when the said valve member engages the said seat.

20. A valve attachment comprising a casing provided with an annular seat, a hollow rock shaft carried in bearings in the said casing, a clapper valve member carried by the said shaft and having a flange around its upper edge adapted to engage beneath the said seat and forming a receptacle having its bottom inclined downwardly toward the said rock shaft and communicating with the bore of the said shaft, an arm carried by the said shaft, a weight carried by the said arm and normally maintaining the said flange of the clapper valve in position against the underside of the said seat, and a tubular member having one end disposed in one of the said bearings adjacent to the said shaft and having its other end open to the atmosphere, the said shaft having an opening in its wall communicating with the said tubular member when the said clapper valve is in position against the said seat, the said opening being out of communication with the said tubular member when the said clapper valve is displaced from the said seat.

In testimony whereof I, the said JOHN F. ROBERTSON, have hereunto set my hand.

JOHN F. ROBERTSON,

Witnesses:
JOHN F. WILL,
EDITH K. FREESE.